Patented Apr. 2, 1935

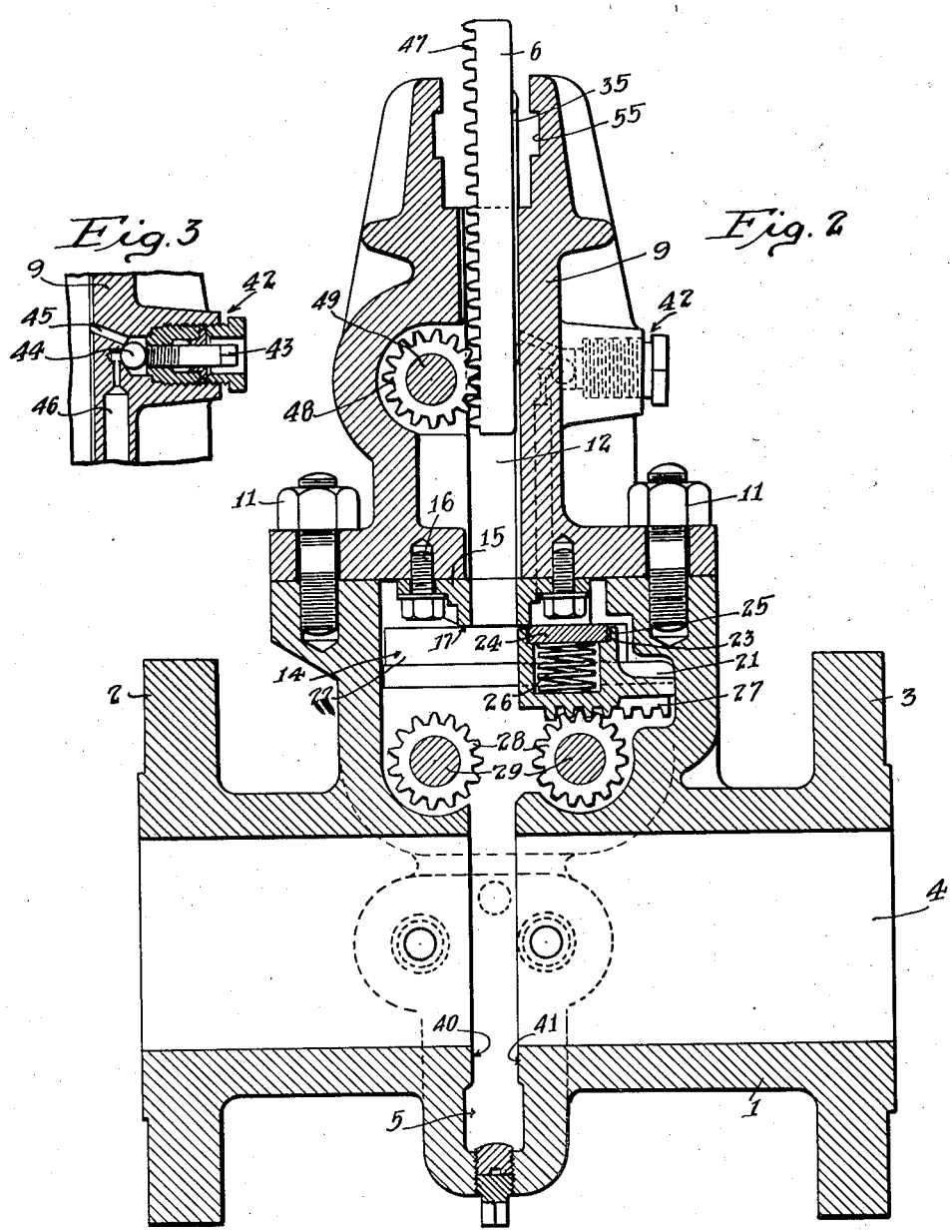

1,996,192

UNITED STATES PATENT OFFICE 1,996,192

VALVE

Paul P. Daniel, Los Angeles, Calif.

Application March 22, 1933, Serial No. 662,018

4 Claims. (Cl. 251—54)

This invention relates to an orifice meter plate housing from which the orifice plate may be easily, quickly and safely changed or inspected without necessitating the shutting off of the fluid passing through the meter housing.

It is an object of this invention to provide an orifice meter from which the metering plate may be easily, quickly and safely changed or inspected without necessitating the shutting off of the fluid passing through the meter housing.

A further object is to provide an orifice meter plate housing which is simple and rugged in design.

A further object is to provide an orifice plate removing chamber and a simple and effective chamber valve means for opening or closing this chamber to or from the meter housing.

A further object is to provide the orifice plate removing chamber with a flat valve seat and to operatively mount a chamber valve carrier provided with a flat chamber valve in the meter housing.

A further object is to provide means carried by the chamber valve carrier for yieldingly urging the flat chamber valve into seating engagement with the chamber valve seat.

A further object is to provide the chamber valve carrier with rack teeth for operative engagement with actuating pinions and means operative from the exterior of the meter housing for actuating the pinions to cause the chamber valve to be moved to an open or closed position.

A further object is to provide a pair of guide rails for maintaining the chamber valve carrier spaced from the chamber valve seat.

A further object is to provide the chamber valve carrier with a pair of spaced flanges for engaging opposite sides of the chamber valve for moving the chamber valve to or from the closed position.

A further object is to provide the chamber valve seat with guideways for supporting the chamber valve when in open position.

A further object is to provide the meter housing with slideways for slidably supporting the chamber valve carrier.

A further object is to provide the chamber valve carrier with spring means for yieldingly urging the chamber valve into seating engagement with the chamber valve seat and the carrier onto the meter housing slideway.

A further object is to provide the plate removing chamber with a removable valve seat.

A further object is to provide a chamber valve which may be a flat block of suitable materal loosely mounted in the carrier.

A further object is to provide a chamber valve and seat which may be easily ground and lapped to seat.

Other objects and advantages of the invention will become apparent as the nature of the same is more fully understood from the following description and accompanying drawings, wherein is set forth what is now considered to be a preferred embodiment. It should be understood, however, that this particular embodiment of the invention is chosen principally for the purpose of exemplification, and that variations therefrom in details of construction, or arrangement of parts, may accordingly be effected and yet remain within the spirit and scope of the invention as the same is set forth in the appended claims.

In the drawings:

Figure 2 illustrates a view similar to Figure 1, excepting for the sake of illustration the chamber is shown in its open position while the orifice plate carrier is being removed from the removing chamber. Ordinarily, of course, the chamber valve would be in the closed position when removing the orifice plate carrier from the removing chamber.

Figure 3 illustrates a sectional view of the pressure equalizing valve.

Figure 1:
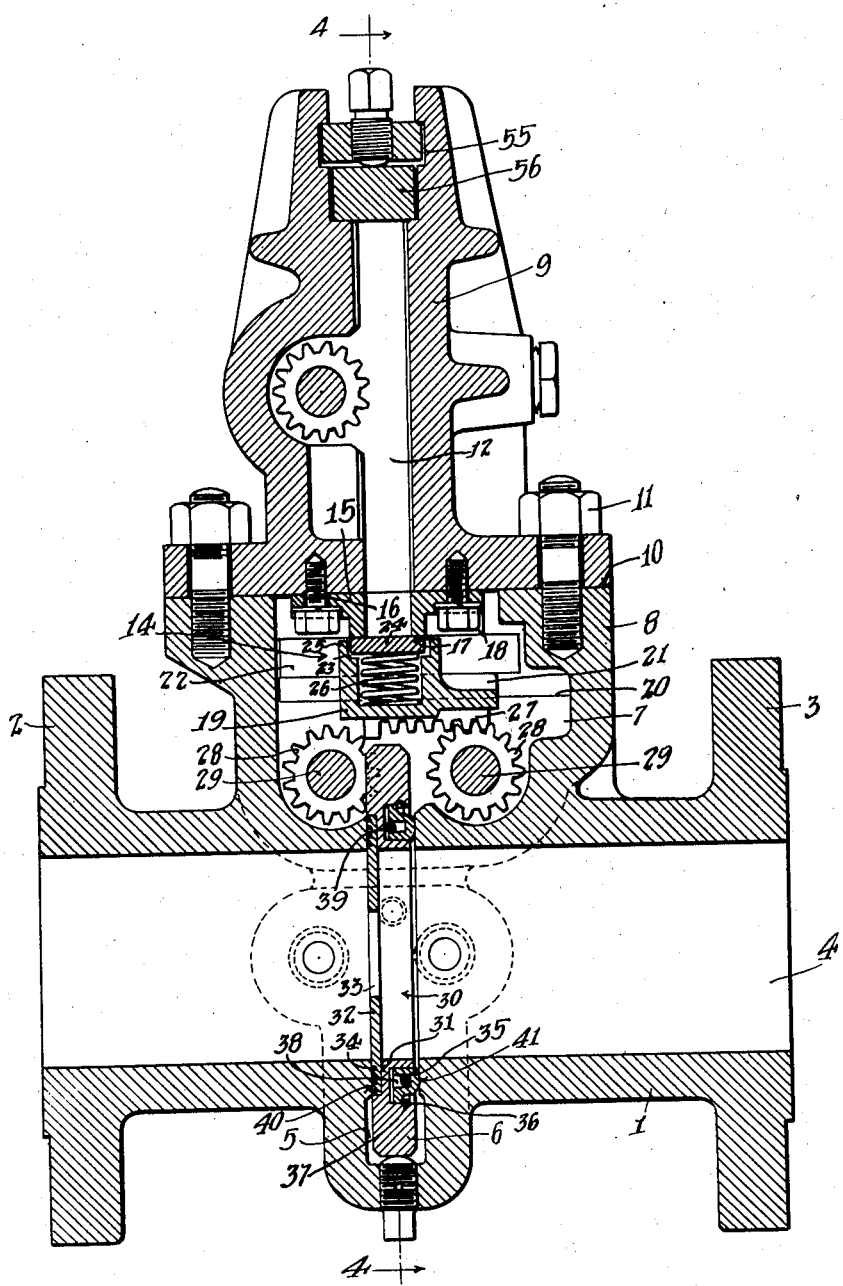
Figure 1 illustrates a sectional view, taken substantially in the plane of the longitudinal axis of the orifice meter, showing the orifice meter in operative position and the chamber valve closed.

The preferred embodiment of the invention illustrated in the drawings may include a meter housing 1 adapted to be positioned in a pipe line and to be secured in position therein by any suitable means, for example, by the flanges 2 and 3. A fluid passage 4 may be provided through the meter housing and an orifice meter cavity 5 may be arranged transversely of said fluid passage. The meter cavity 5 may be appropriately shaped to receive and guide the orifice plate carriage 6 and may communicate with the meter housing valve chest 7 confined within the flanged walls 8 of the meter housing.

A chamber casting 9 may be suitably mounted upon the top surface 10 of walls 8 as by suitable bolt means 11, and may be provided with a suitable chamber 12 in alignment with the meter cavity 5 and arranged to receive the plate carriage 6.

Figure 4:
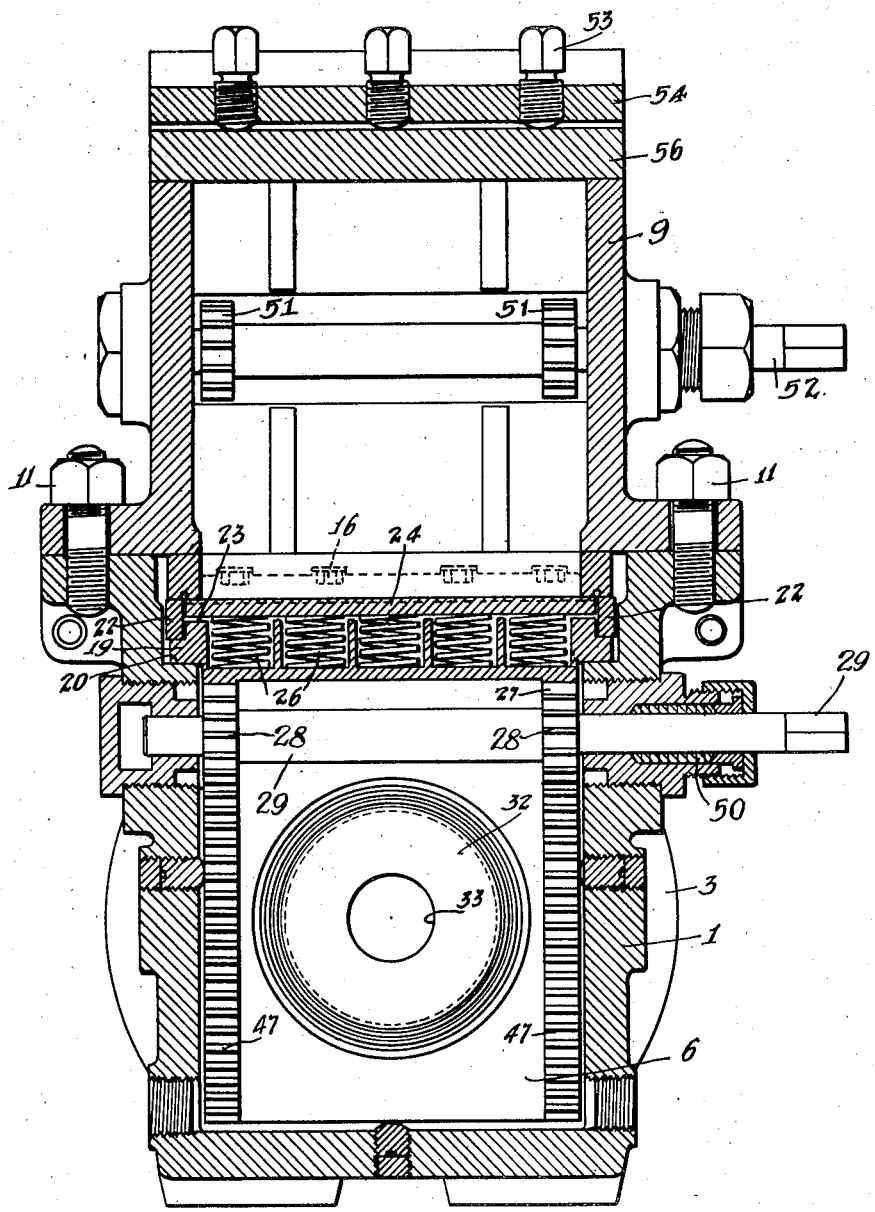
Figure 4 illustrates a sectional view taken substantially in the plane of line 4—4 of Figure 1.

A chamber valve 14 may be provided for closing off chamber 12 from communication with the valve chest 7, which chest is in constant communication with the fluid passage 4, whereby, during the normal operation of the meter, the chamber valve may be positioned as illustrated in Figs. 1 and 4 to seal chamber 12 against the pressure of the fluid passing through the meter.

The construction and arrangement of the chamber valve is one of the important features of this invention. The chamber valve must be easily and quickly operative and must tightly seal the valve chest against leakage, especially when the chamber 12 has been opened to remove the plate carriage. The construction of the chamber valve may be substantially as follows: The chamber member or casting 9 may be provided with a valve seat 15 which may be formed integral with the chamber casting or formed as a separate part or casting and securely fastened to the chamber casting by means of bolts 16. The seating surface 17 of the valve seat may be flat and substantially at right angles to the axis of chamber 12 and may be provided with guideways 18 for supporting the chamber valve when in the open position.

A chamber valve carrier 19 may be slidably mounted in the meter housing 1 by providing it with a slideway 20 along which the flanges 21 of the valve carrier may be slidably mounted.

In order to maintain the valve carrier spaced from the valve seat 15, guide rails 22, (note Fig. 4), may be provided between the carrier flanges and the valve seat. The valve carrier 19 may be more or less box shaped and grooved along its upper surface, as at 23, to loosely receive the flat chamber valve 24. The upper walls 25 of the valve carrier groove 23 may act to retain valve 24 in operative position within the valve carrier 19 and may also act to move the valve to its open or closed positions when the carrier is correspondingly moved.

Means may be provided for resiliently urging the flat valve 24 into engagement with seat 15 and the carrier 19 into engagement with the slideways 20 which means may include a plurality of springs 26 mounted in the box section of the carrier and acting to yieldingly force the valve and carrier apart so that the valve will be urged into engagement with the valve seat while the carrier is urged into engagement with the slideway 20.

Means may be provided for sliding the valve carrier 19 back and forth so as to slide the flat chamber valve 24 to its open or closed positions, which means may include providing rack teeth 27 along each end of the carrier. The rack teeth may be emmeshed with a pair of spaced spur pinions 28 operatively mounted upon the valve actuating shaft 29, which may be extended through one side of the meter housing and provided with suitable packing means for preventing fluid leakage.

The valve actuating shaft 29 and packing means may correspond with the plate carriage elevating shaft and stuffing box means, as illustrated in Fig. 4.

In Fig. 1 the orifice meter is illustrated in its normal operative position wherein the chamber valve 14 is shown in its closed position and the plate carriage 6 is shown in the meter housing cavity 5. The plate carriage 6 may be rectangular in shape and may be provided with central opening 30 normally in alignment with the fluid passage 4. By placing the opening 30 central of carriage 6, the opening will align with the fluid passage 4 whether the top or bottom end of the carriage is first entered into the housing cavity 5. The plate carriage may be provided on one face with a concentric recess 31 for receiving the orifice plate 32 having an orifice 33 of given dimension, while upon its opposite face the carriage may be provided with a concentric annular groove 34 for receiving the pressure ring 35 yieldingly urged in a direction to move out of groove 34 but prevented from moving beyond a predetermined point by means of the snap ring 36 resting in a semicircular groove 37 formed in the outer face of the annular groove 34. The pressure ring 35 may be provided with an annular groove 38 facing in the direction of the bottom surface of the annular groove 34 for the accommodation of suitable spring means 39.

The housing cavity 5 may be provided with opposed seats 40 and 41. Against seat 40 the orifice plate 32 may be adapted to seat while pressure ring 35 may act against seat 41 to yieldingly urge orifice plate 32 through the carriage against seat 40.

It is often desirable to inspect the orifice plate or to replace the orifice plate with a new one without necessitating the shutting-off of the fluid flowing through passage 4.

With this invention, easy, quick and safe means are provided for changing or inspecting the orifice plates while the fluid pressure is maintained in the meter housing. The procedure for changing or inspecting the orifice plate may be as follows: First the pressure-equalizing valve 42, (note Figs. 2 and 3), may be opened by means of valve rod 43 to release the ball valve 44, whereby the passages 45 and 46 are opened to equalize the pressures in the chamber and meter housing. Second, the chamber valve 14 may be opened by rotating the valve actuating shaft 29 by any suitable wrench or means, which rotation will simultaneously rotate the spaced pinions 28 to gear the chamber valve carrier from the position as illustrated in Fig. 1 to the position of Fig. 2, whereby the flat chamber valve 24 will be moved clear of the opening through the valve seat and will be slid onto the guideways 18 formed on the valve seat to prevent valve 24 from becoming displaced.

It may be noted that only a quarter turn of the valve actuating shaft 29 is required to slide the valve from its closed to its open position; thus the valve is easily and quickly opened. Third, the plate carriage is elevated until it is completely within chamber 12. The means for elevating the plate carriage may include providing each edge, of the orifice plate side, of the carriage, with rack teeth 47 and providing adjacent the upper edge of the carriage a pair of spaced spur pinions 48 mounted upon the carriage elevating shaft 49 which shaft may extend through a suitable stuffing box 50 to the exterior of the meter housing and may be provided with a squared end for receiving a suitable wrench or wheel for rotating the shaft and pinions, which pinions 48 mesh with the rack teeth 47 to elevate the carriage. A similar set of spaced gears 51, mounted upon a shaft 52, may be provided in chamber 12 for elevating the carriage when the rack teeth 47 travel beyond the influence of pinions 48. Likewise shaft 52 may be rotated by means of a wrench or hand wheel until carriage 6 has been elevated above the chamber valve 14. Fourth, the equalizing valve 42 may be closed. Fifth, the chamber valve 14 may be returned to its closed position by again rotating the valve actuating shaft 29.

Sixth, the chamber 12, as is customary in such structures, is provided with a relief or bleeder valve (not shown), which bleeder valve is open to bleed the high pressure fluid from the chamber before the closure member is removed to change the orifice plates. Seventh, the set screws 53 in the clamping bar 54 may be loosened in order that the clamping bar may be removed from the grooves 55 formed in the upper end of the chamber casting 9. Eighth, by means of shaft 52 carriage 6 may be elevated and will lift the sealing bar 56 above the top of casting 9 so that it may be easily removed, and then continuing the elevation of the plate carriage until it may be lifted from the chamber, whereupon the orifice plate may be inspected or replaced as desired. By reversing the above procedure the orifice plate may be easily, quickly and safely returned into its operative position, as illustrated in Fig. 1.

Having fully described the invention, it is to be understood that it is not to be limited to the details herein set forth, but the invention is of the full scope of the appended claims.

I claim:

1. In a valve structure, a valve housing having a valve chest formed therein, a ported valve seat formed in said housing, a valve carrier slidably mounted in the valve chest, a valve member loosely mounted in said carrier, spring means mounted in said carrier for yieldingly urging the valve member into sealing engagement with the valve seat, a floating guide rail carried by each end of the valve carriage for maintaining the carriage spaced a predetermined distance from the valve seat, and means operable from the exterior of said housing for actuating said carrier to move the valve member to open or close the valve seat port.

2. In a valve structure, a valve housing having a valve chest formed therein, a ported valve seat formed in said housing, a valve carrier slidably mounted in the valve chest, a valve member loosely mounted in said carrier, spring means mounted in said carrier for yieldingly urging said valve member into sealing engagement with the valve seat, a pair of floating guide rails acting between the ends of the valve carriage and valve seat for maintaining the valve carrier a predetermined distance from the valve seat, rack teeth provided on said carrier, and gear means in mesh with said rack teeth and operable from the exterior of said housing for actuating said carrier to move the valve member to open or close the valve seat port.

3. In a valve structure, a valve housing having a valve chest formed therein, a ported valve seat formed in the valve chest, a grooved valve carrier slidably mounted in the valve chest, floating guide rail means for spacing the carrier from the valve seat, a valve member loosely mounted in the carrier groove and positioned therein by said guide rails, spring means for yieldingly urging said valve member into sealing engagement with the valve seat, a series of rack teeth formed adjacent each end of said carrier, a pair of spaced pinions in mesh with said rack teeth, and a shaft operable for rotating said pinions journaled in and extending through said housing.

4. In a valve structure, a valve housing having a valve chest formed therein, a ported valve seat formed in said valve chest, a grooved valve carrier slidably mounted in the valve chest, a valve member loosely mounted in the carrier groove, spring means mounted in the carrier and operative for yieldingly urging the valve member into sealing engagement with the valve seat, a floating guide rail for maintaining the carriage a predetermined distance from the valve member and for maintaining the valve member correctly positioned in the carrier groove, a series of rack teeth carried adjacent each end of the valve carrier, a pair of spaced pinions in mesh with said rack teeth, a shaft operable for rotating said pinions journaled in and extending through said housing, and a stuffing box carried by the housing through which the shaft passes to prevent leakage of fluid from the housing.

PAUL P. DANIEL.